US011456678B2

(12) United States Patent
Akazawa et al.

(10) Patent No.: US 11,456,678 B2
(45) Date of Patent: Sep. 27, 2022

(54) POWER CONVERSION DEVICE

(71) Applicant: Hitachi, Ltd, Tokyo (JP)

(72) Inventors: Shoya Akazawa, Tokyo (JP); Hiroyuki Ozawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/287,013

(22) PCT Filed: Oct. 1, 2019

(86) PCT No.: PCT/JP2019/038689
§ 371 (c)(1),
(2) Date: Apr. 20, 2021

(87) PCT Pub. No.: WO2020/085007
PCT Pub. Date: Apr. 30, 2020

(65) Prior Publication Data

US 2021/0336556 A1 Oct. 28, 2021

(30) Foreign Application Priority Data

Oct. 22, 2018 (JP) ............................ JP2018-198131

(51) Int. Cl.
*H02M 7/487* (2007.01)
*H02M 7/00* (2006.01)
(Continued)

(52) U.S. Cl.
CPC .............. *H02M 7/487* (2013.01); *B60M 1/02* (2013.01); *B61C 17/00* (2013.01); *H02M 7/003* (2013.01); *H02M 7/5387* (2013.01)

(58) Field of Classification Search
None
See application file for complete search history.

(56) References Cited

U.S. PATENT DOCUMENTS 5,886,888 A * 3/1999 Akamatsu ............. H02M 7/493 363/71
2017/0338734 A1* 11/2017 Nakashima ............. H02M 1/34
2020/0043887 A1* 2/2020 Ogawa .................... H01L 24/32

FOREIGN PATENT DOCUMENTS

GB 2541966 A 3/2017
JP 7-274529 A 10/1995
(Continued)

OTHER PUBLICATIONS

International Search Report (PCT/ISA/210) issued in PCT Application No. PCT/JP2019/038689 dated Dec. 10, 2019 with English translation (two (2) pages).
(Continued)

*Primary Examiner* — Jared Fureman
*Assistant Examiner* — Aqeel H Bukhari
(74) *Attorney, Agent, or Firm* — Crowell & Moring LLP

(57) ABSTRACT

In order to reduce noise current leaking out from a frame to which semiconductor devices constituting a three-level power conversion circuit are attached to the outside of a power conversion device, the frame to which the semiconductor devices constituting the three-level power conversion circuit with which the power conversion device is equipped are attached is configured to be electrically connected to a neutral point of the three-level power conversion circuit. The noise current leaking out from the frame is thereby drawn back to the neutral point of the three-level power conversion circuit to suppress the flowing out of the noise current to the outside of the power conversion device and reduce the noise current.

9 Claims, 5 Drawing Sheets

15
14
13
7
5
6
8
9
10
11
2
3
12
1
4

(51) Int. Cl.

| | |
|---|---|
| ***H02M 7/5387*** | (2007.01) |
| ***B61C 17/00*** | (2006.01) |
| ***B60M 1/02*** | (2006.01) |

(56) References Cited

FOREIGN PATENT DOCUMENTS

| | | | |
|---|---|---|---|
| JP | 7-298642 | A | 11/1995 |
| JP | 9-9412 | A | 1/1997 |
| JP | 2003-235269 | A | 8/2003 |
| JP | 2016-213945 | A | 12/2016 |
| JP | 2018-68009 | A | 4/2018 |
| WO | WO 2005/028242 | A1 | 3/2005 |

OTHER PUBLICATIONS

Japanese-language Written Opinion (PCT/ISA/237) issued in PCT Application No. PCT/JP2019/038689 dated Dec. 10, 2019 (four (4) pages).

Hindi-language Office Action issued in Indian Application No. 202117018251 dated Feb. 14, 2022 with English translation (six (6) pages).

* cited by examiner 1
2
3
4
5
6
7
8
9
10
11
12
13
14
15

16
17
18
19
20
21
22
O
23
24
25
26
27
P
N
11
28
30
31
12

POWER CONVERSION DEVICE

TECHNICAL FIELD

The present invention relates to a power converter including a three-level power conversion circuit, and is suitable as a power converter for railway systems.

BACKGROUND ART

A three-level power converter can divide a direct current power supply voltage with two sets of smoothing capacitors, and can select and output three types of potentials, including positive, negative, and intermediate potentials, of the direct current power supply voltage. Accordingly, this is a power converter used in a case where a direct current power supply voltage is high, or in a case where a harmonic of a voltage and a current applied to an alternating current load or an alternating current power supply to be connected is desired to be reduced.

PTL 1 discloses a technique of reducing a withstand voltage of a device involved in charging and reducing the size and cost of the device by providing an initial charging circuit for a smoothing capacitor included in a power converter, which includes a three-level PWM converter and a PWM inverter.

CITATION LIST

Patent Literature

[PTL 1] JP-A-H07-274529

SUMMARY OF INVENTION

Technical Problem

With a switching operation of a semiconductor device constituting a main circuit, a noise current flows to a frame of a power unit via a stray capacitance between the semiconductor device and the frame. The frame of the power unit and the power converter are conducted via an attachment portion, making the noise current flow out to the power converter. In addition, since the power converter is connected to a vehicle body via a ground circuit, the noise current that flows to the outside of the power converter also flows out to the vehicle body. When this noise current flows out to the vehicle body, there is a problem that a high-frequency potential variation is caused in the vehicle body and a failure occurs in a signal device.

Solution to Problem

In order to solve the above problems, a power converter according to the invention includes a three-level power conversion circuit, in which a frame to which a semiconductor device constituting the three-level power conversion circuit is attached is electrically connected to a neutral point of the three-level power conversion circuit.

Advantageous Effect

According to the invention, the frame to which the semiconductor device constituting the three-level power conversion circuit is attached is electrically connected to the neutral point of the three-level power conversion circuit. Thereby, the noise current generated from the three-level power conversion circuit can be drawn back to the three-level power conversion circuit, and the noise current flowing out to the outside of the power converter can be reduced.

DESCRIPTION OF EMBODIMENTS

Hereinafter, first and second embodiments according to the invention will be described with reference to the drawings as modes for carrying out the invention.

First Embodiment

Figure 1:
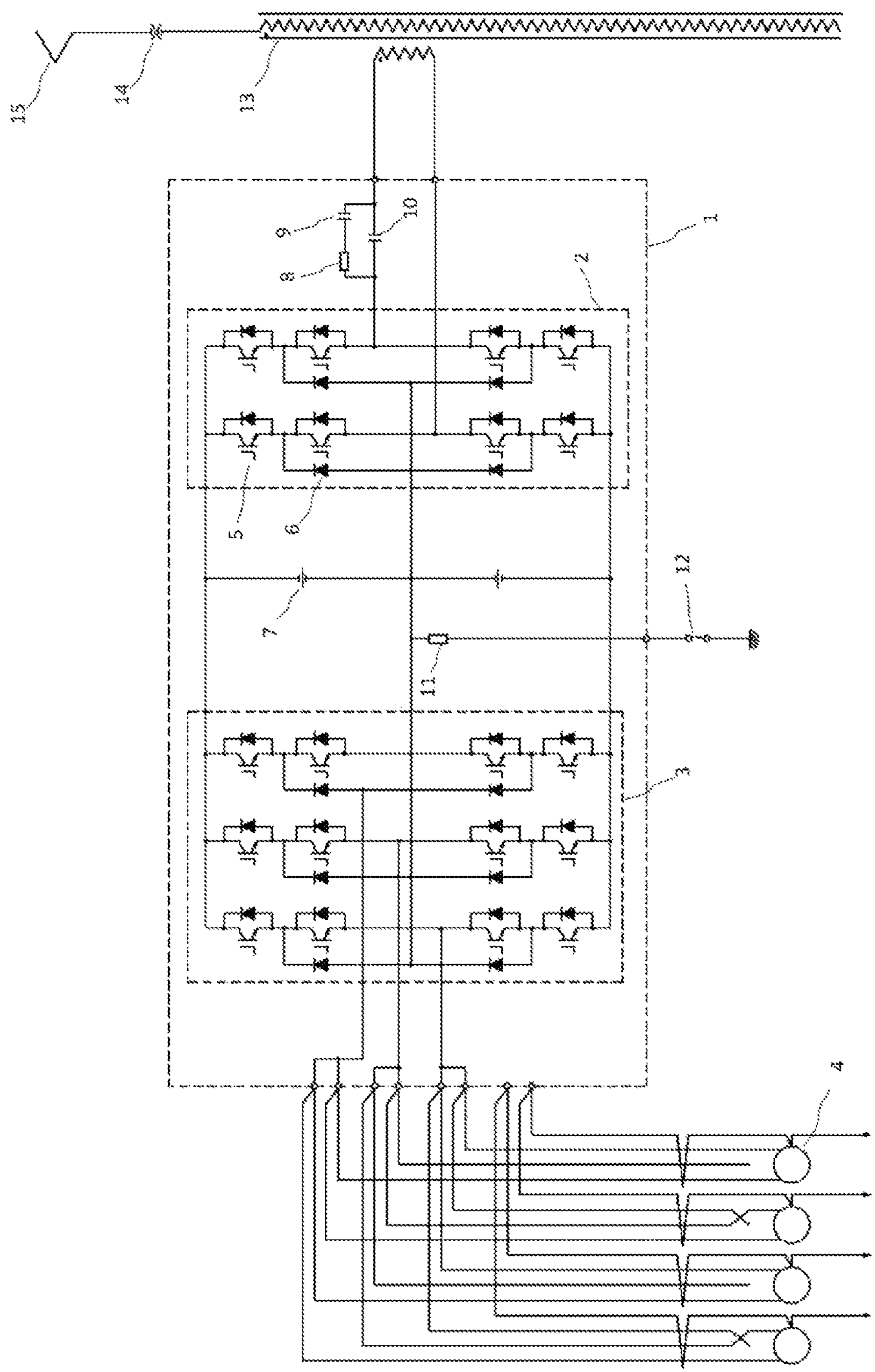
FIG. 1 is a diagram showing an overall configuration of a power converter according to a first embodiment of the invention.

FIG. 1 is a diagram showing an example of an overall configuration of a power converter according to the first embodiment of the invention. Although FIG. 1 shows a power converter to be mounted on a railway vehicle, the invention is widely applicable not only to an electric vehicle but also to a power converter used in power electronics related fields such as industrial use.

A power converter 1 includes a converter power unit 2, which is a three-level power conversion circuit, and an inverter power unit 3. The power converter 1 is mounted, for example, for an alternating current vehicle, and takes in a single-phase alternating current power from an alternating current overhead line via a pantograph 15 by passing the power through a vacuum alternating current contactor 14 and lowering the voltage with a main transformer 13.

The alternating current power taken into the power converter 1 passes through an electromagnetic contactor 9 or 10 and is then rectified by the converter power unit 2. The rectified direct current power is taken into the inverter power unit 3, and the alternating current power obtained by conversion is supplied to a main motor 4 and controlled.

Further, in the power converter 1, the inverter power unit 3 and the converter power unit 2 are three-level circuits, and have a configuration in which a neutral point is grounded. Regarding the grounding of the neutral point, in FIG. 1, the neutral point is configured to be grounded via a ground resistor 11 and a ground switch 12. Here, the ground switch 12 is turned on in a normal state including operation, and is turned off in a special case such as a withstand voltage test.

As a semiconductor device constituting the converter power unit 2 and the inverter power unit 3, semiconductor device 5 and clamp diodes 6 that perform a switching operation as a main circuit are attached to frames of the power units. In addition, on the other hand, it is also general that a cooler for the power unit is attached to each frame of the power units as shown in, for example, FIG. 3, which will be described later.

In addition, regarding the semiconductor device constituting the converter power unit and the inverter power unit, as the semiconductor devices that perform a switching operation as a main circuit, IGBT, hybrid SiC (a combination of IGBT and a SiC Schottky barrier diode), or full SiC is adopted.

Further, although FIG. 1 shows a configuration of the power converter in a case of an alternating current vehicle in which a single-phase alternating current power is taken in from the alternating current overhead line, it is a matter of course that the invention can also be applied to a power converter in a case where a direct current power is taken in from a direct current overhead line. In this case, the power converter includes an inverter power unit, which is a three-level circuit.

Figure 2:
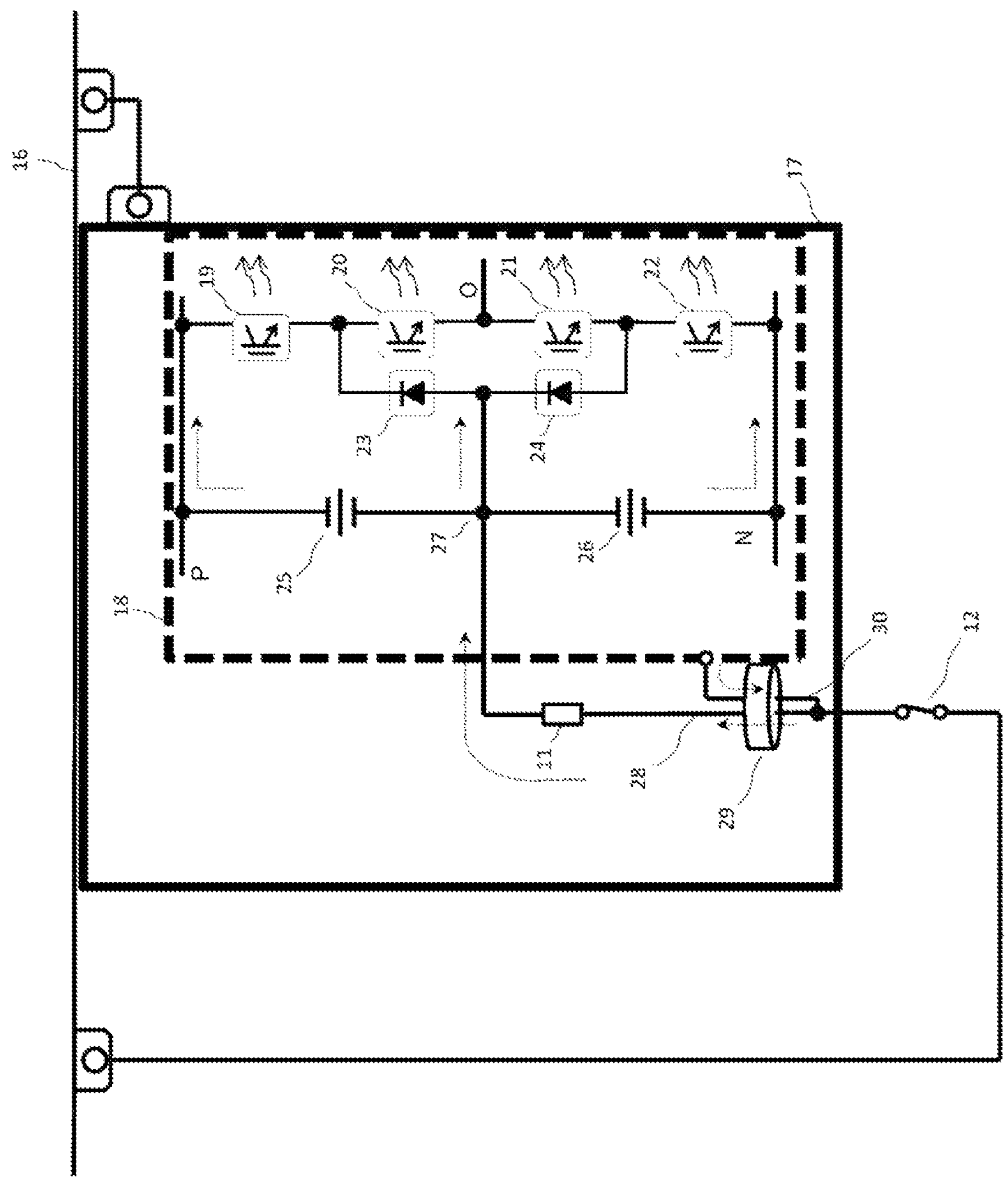
FIG. 2 is a diagram showing connection between a configuration of a part of the power conversion circuit included in the power converter according to the first embodiment and a vehicle body.

FIG. 2 is a diagram showing connection between a configuration of a part of the power conversion circuit included in the power converter according to the first embodiment and a vehicle body.

Figure 3:
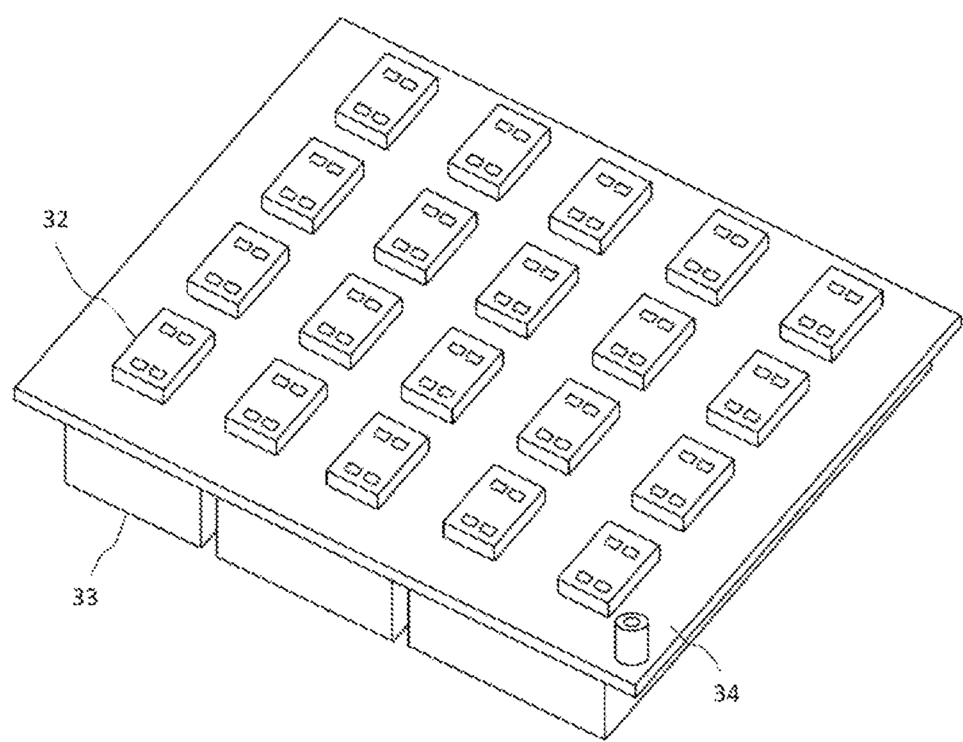
FIG. 3 is a diagram showing a semiconductor device of the power converter according to the first embodiment and a frame of a power unit on which the semiconductor device is attached.

A power converter 17 (whose outline is in solid line shown in FIG. 2) is attached to a vehicle body 16. In addition, a neutral point 27 of the three-level inverter is configured to be electrically connected to a frame 18 (whose outline is in broken line shown in FIG. 2) of the power unit to which semiconductor devices 19 to 22 and clamp diodes 23 and 24 constituting one phase of the inverter are attached. Here, as shown in FIG. 3, the frame 18 of the power unit also serves as a frame of the cooler for the power unit.

Specifically, as shown in FIG. 2, the neutral point 27 of the three-level inverter is configured to be connected to the vehicle body 16 (that is, ground) via the ground resistor 11 and a noise absorbing core 29 via the ground switch 12, and the frame 18 of the power unit (and the cooler) is configured to be connected to the vehicle body 16 via the noise absorbing core 29 passing through the ground switch 12.

Here, in the invention, by adopting a configuration in which the frame to which the semiconductor devices constituting the three-level power conversion circuit are attached is electrically connected to the neutral point of the three-level power conversion circuit, a noise current generated from the three-level power conversion circuit is drawn back to the three-level power conversion circuit, and the noise current can be prevented from flowing out to the outside of the power converter. The configuration shown in FIG. 2 can be said to be a configuration in which the above basic configuration according to the invention is added to an existing ground circuit (grounding via a ground resistor and a ground switch). In addition, the noise absorbing core 29 is provided to further reduce the noise current to enhance the effect.

With the above configuration, the noise current, which flows to the frame 18 of the power unit (and the cooler) along with a potential variation caused by the switching operation of the semiconductor devices 19 to 22 constituting the main circuit, passes through the noise absorbing core 29 back and forth and then flows to the neutral point 27 of the three-level inverter via the ground resistor 11, as indicated by the dotted line of the arrows in FIG. 2. Accordingly, the noise current can be prevented from positively flowing to the power converter 17 and the vehicle body 16, the noise current to the vehicle body can be reduced, and the communication failure to the signal device can be reduced.

The noise absorbing core 29 is a ferrite core, and by flowing a current into the core, the magnetic energy generated by the noise current is converted into heat by the core for consumption, and the noise current is reduced.

As described above, flowing the noise current flowing to the frame 18 of the power unit (and the cooler) to the neutral point 27 of the three-level inverter by using the noise absorbing core 29 is effective means for reducing the noise current. However, the noise absorbing core 29 is not an essential constituent element, and as long as, at a minimum, a configuration in which the frame 18 of the power unit (and the cooler) is connected to the neutral point 27 of the three-level inverter is adopted, it is possible to prevent the noise current from flowing to the power converter 17 and the vehicle body 16.

FIG. 3 is a diagram showing the semiconductor devices (the semiconductor devices constituting the main circuit and the clamp diode) of the power converter according to the first embodiment and the frame of the power unit on which the semiconductor devices are attached.

When configuring the power unit, semiconductor devices 32 are attached to one side of a frame 34 of the power unit, and power unit coolers 33 are attached to the other side. In the invention, along with the potential variation caused by the switching operation of the semiconductor devices constituting the main circuit, the noise current flows to the frame of the power unit via the stray capacitance between the semiconductor devices and the frame. However, by connecting the frame of the power unit to the neutral point of the three-level inverter, the noise current can be positively prevented from flowing out to the vehicle body.

Figure 4A:
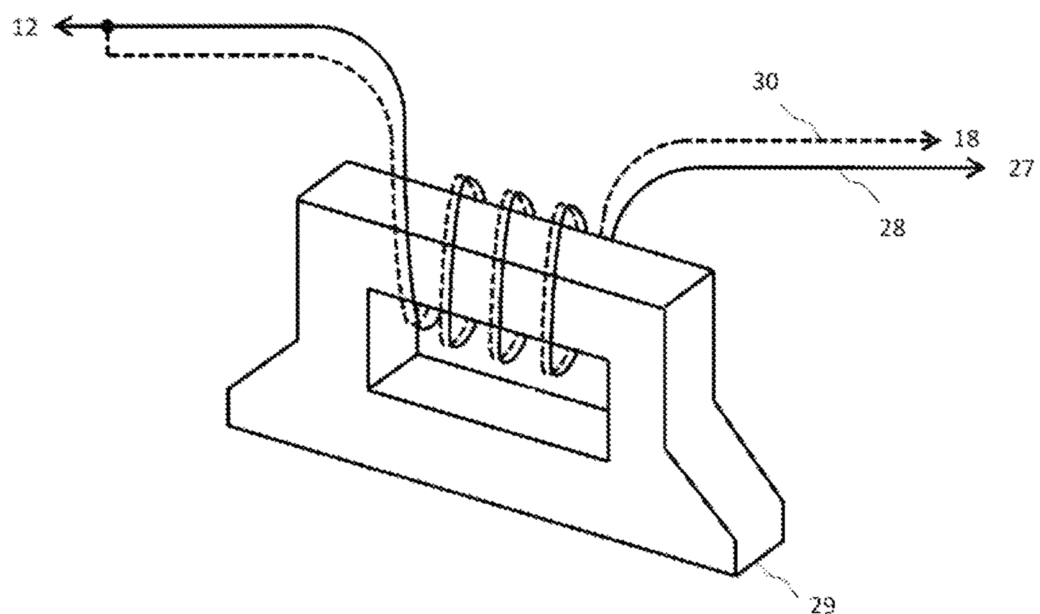
FIGS. 4A and 4B show diagrams showing an example of a wiring and an example of a component of a noise absorbing core used in the power converter according to the first embodiment.
Figure 4B:
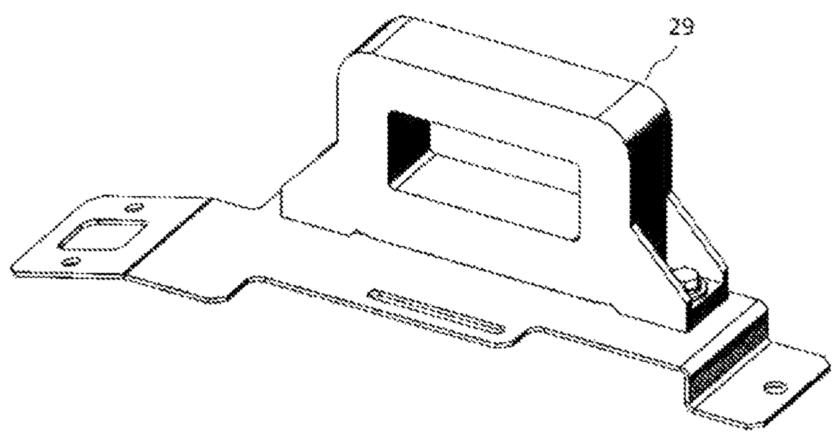

FIG. 4 shows diagrams showing an example of a wiring and an example of a component of the noise absorbing core used in the power converter according to the first embodiment.

FIG. 4(*a*) shows an example of a wiring between the noise absorbing core 29 and a wiring that electrically connects the neutral point 27 of the three-level inverter to the frame 18 of the power unit (and the cooler) to which the semiconductor devices are attached, as shown in FIG. 2. A wiring 28 (shown by a solid line) electrically connected to the neutral point 27 of the three-level inverter and a wiring 30 (shown by a broken line) electrically connected to the frame 18 of the power unit (and the cooler) to which the semiconductor devices are attached are wound around the noise absorbing core 29 for a plurality of times and then directly connected to each other. That is, the connection configuration other than winding the wiring 28 and the wiring 30 around the noise absorbing core 29 for a plurality of times is the same as the connection configuration shown in FIG. 2.

In this way, the wiring 30 electrically connected to the frame 18 and the wiring 28 electrically connected to the neutral point 27 of the three-level inverter are wound around the noise absorbing core 29 for a plurality of times, so that the attenuation effect for the noise current flowing to the frame 18 by the noise absorbing core 29 can be enhanced, and the noise can be further reduced.

FIG. 4(*b*) shows a perspective view of an example of a component adopted as the noise absorbing core.

Second Embodiment

Figure 5:
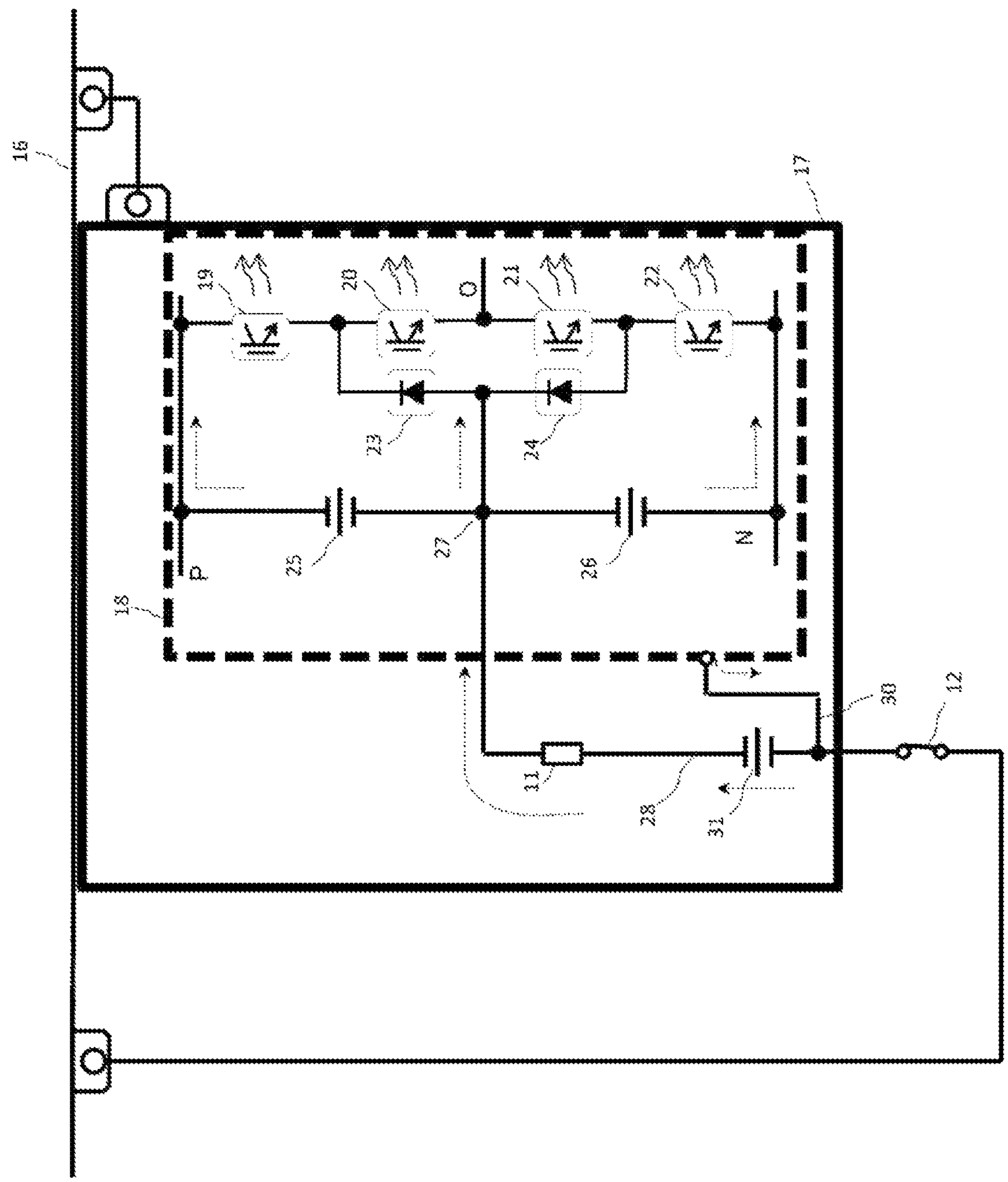
FIG. 5 is a diagram showing connection between a configuration of a part of a power conversion circuit according to a second embodiment of the invention and a vehicle body.

FIG. 5 is a diagram showing connection between a configuration of a part of a power conversion circuit according to the second embodiment and a vehicle body. The same reference numerals are denoted by the same elements as the configuration shown in FIG. 2.

As a difference in configuration from the first embodiment, a core is used for reducing the noise in the first embodiment, while a capacitor is used in the second embodiment instead of the core. That is, as shown in FIG. 5, one end of a noise absorbing capacitor 31 is connected to the neutral point 27 side of the three-level inverter, and the other end of the noise absorbing capacitor 31 is connected to the frame 18 side of the power unit (and the cooler).

With the above configuration, the noise current flowing to the frame 18 of the power unit (and the cooler) passes through the noise absorbing capacitor 31 and then flows to the neutral point 27 of the three-level inverter via the ground resistor 11, as shown by the dotted line of arrows in FIG. 5. Accordingly, the noise current can be prevented from positively flowing to the power converter 17 and the vehicle body 16, the noise current to the vehicle body can be reduced, and the communication failure to the signal device can be reduced. That is, when the configuration according to the second embodiment is adopted, the same effect as the first embodiment can also be obtained.

REFERENCE SIGN LIST

1, 17 power converter
2 converter power unit
3 inverter power unit
4 main motor
5, 19 to 22, 32 semiconductor device
6, 23, 24 clamp diode
7, 25, 26 filter capacitor
8 pre-charge resistor
9 electromagnetic contactor for pre-charging
10 electromagnetic contactor
11 ground resistor
12 ground switch
13 main transformer
14 vacuum contactor
15 pantograph
16 vehicle body
18 frame of power unit
27 neutral point of three-level inverter
28, 30 wiring
29 noise absorbing core
31 noise absorbing capacitor
33 power unit cooler
34 frame of power unit and cooler

The invention claimed is:

1. A power converter comprising:
a three-level power conversion circuit, wherein
a frame to which a semiconductor device constituting the three-level power conversion circuit is attached is electrically connected to a neutral point of the three-level power conversion circuit;
wherein
a noise absorbing core is provided in a path of a wiring that electrically connects the frame to the neutral point of the three-level power conversion circuit.

2. The power converter according to claim 1, wherein
a wiring electrically connected to the frame and a wiring electrically connected to the neutral point of the three-level power conversion circuit are wound around the noise absorbing core for a plurality of times and then directly connected to each other.

3. The power converter according to claim 1, wherein
a ground line extending from the neutral point to a ground via a ground resistor is used as the wiring electrically connected to the neutral point of the three-level power conversion circuit.

4. The power converter according to claim 1, wherein the frame is accommodated in the power converter.

5. The power converter according to claim 1, wherein the frame is also a frame of a cooler configured to cool the semiconductor device.

6. The power converter according to claim 1, wherein
the power converter comprises at least one of an inverter configured to convert a direct current power into an alternating current power and a converter configured to convert an alternating current power to a direct current power.

7. The power converter according to claim 1, wherein
as the semiconductor device that performs a switching operation, any one of IGBT, hybrid SiC, and full SiC is used.

8. A railway vehicle on which the power converter according to claim 1 is mounted.

9. A power converter comprising:
a three-level power conversion circuit, wherein
a frame to which a semiconductor device constituting the three-level power conversion circuit is attached is electrically connected to a neutral point of the three-level power conversion circuit, wherein
a noise absorbing capacitor is provided in a path of a wiring that electrically connects the frame to the neutral point of the three-level power conversion circuit.

* * * * *